US008554347B2

(12) United States Patent
Suyama et al.

(10) Patent No.: US 8,554,347 B2
(45) Date of Patent: Oct. 8, 2013

(54) REMOTE AUDIO AMPLIFIER MONITORING SYSTEM

(75) Inventors: Akio Suyama, Hamamatsu (JP); Takaaki Muto, Hamamatsu (JP); Naohide Kohyama, Hamamatsu (JP); Ken Iwayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1023 days.

(21) Appl. No.: 12/183,466

(22) Filed: Jul. 31, 2008

(65) Prior Publication Data

US 2009/0033412 A1 Feb. 5, 2009

(30) Foreign Application Priority Data

Aug. 1, 2007 (JP) ................................ 2007-200670
Aug. 1, 2007 (JP) ................................ 2007-200671

(51) Int. Cl.
*G06F 17/00* (2006.01)

(52) U.S. Cl.
USPC ............. 700/94; 381/104; 381/105; 381/106; 381/107; 381/108; 381/109; 381/119; 381/120; 381/121; 715/716; 715/727

(58) Field of Classification Search
USPC ........................................................... 700/94
See application file for complete search history.

(56) References Cited

U.S. PATENT DOCUMENTS

| | | | | |
|---|---|---|---|---|
| 5,657,221 | A * | 8/1997 | Warman et al. | 700/83 |
| 6,028,602 | A * | 2/2000 | Weidenfeller et al. | 715/781 |
| 7,062,718 | B2 * | 6/2006 | Kodosky et al. | 715/771 |
| 7,571,014 | B1 * | 8/2009 | Lambourne et al. | 700/94 |
| 2002/0003548 | A1 * | 1/2002 | Krusche et al. | 345/736 |
| 2003/0088852 | A1 * | 5/2003 | Lacas et al. | 717/121 |
| 2003/0138353 | A1 * | 7/2003 | Bargoot et al. | 422/58 |
| 2003/0198353 | A1 * | 10/2003 | Monks et al. | 381/58 |
| 2005/0246041 | A1 * | 11/2005 | Kreifeldt et al. | 700/94 |
| 2006/0153496 | A1 * | 7/2006 | Tanobe et al. | 385/24 |
| 2008/0320539 | A1 * | 12/2008 | Ohkita | 725/118 |

FOREIGN PATENT DOCUMENTS

| | | | |
|---|---|---|---|
| EP | 1 172 721 | A1 | 1/2002 |
| JP | 2002-132407 | A | 5/2002 |

OTHER PUBLICATIONS

IQwic: CrownAudio: Copyright 2004.*
IQNet: CrownAudio: available since at least Feb. 2006.*
SNMP: copyright 2005.*
Notice of Reason for Rejection mailed Jun. 16, 2009, for JP Patent Application No. 2007-200670, with English translation, four pages.
European Search Report dated Jun. 6, 2013, for EP Application No. 08161427, filed Jul. 30, 2008, six pages.
Yamaha: (Jan. 1, 2003). "NetworkAmp Manager—Owner's Manual," Internet Citation, Retrieved from the Internet: URL: http://www.manualnguide.com/dl/486 (retrieved on Mar. 11, 2009), pp. 1-43.

* cited by examiner

*Primary Examiner* — Paul McCord
(74) *Attorney, Agent, or Firm* — Morrison & Foerster LLP

(57) ABSTRACT

An apparatus is provided for remotely monitoring a plurality of amplifiers on a display device. The amplifiers are provided to process audio signals and directly or indirectly connected to a network. In the apparatus, a collecting section collects a group code from each of the amplifiers through the network. The group code is allocated to each amplifier according to a grouping system for grouping the plurality of the amplifiers. A display control section displays a tree diagram of the amplifiers according to the collected group codes on the display device as a graphical representation of the grouping system.

9 Claims, 15 Drawing Sheets

PROJECT FILE (PER ONE NETWORK)

GROUP NAME : [FIRST LAYER NAME]-[SECOND LAYER NAME]-[THIRD LAYER NAME]

DEVICE INFORMATION OF NEW TYPE AMPLIFIER (PER ONE DEVICE)

GROUP CODE : [FIRST LAYER NUMBER]-[SECOND LAYER NUMBER]-[THIRD LAYER NUMBER]
1-1-1, 1-1-2, 1-3-1, ETC.

DEVICE INFORMATION OF ACD (PER ONE DEVICE)

TREE REPRESENTATION EXAMPLE (RACK TREE)

FIG.14
40 MONITORING SCREEN
41 TAB
42 TREE DISPLAY PORTION
43 STATUS DISPLAY PORTION
AmP Manger II
Device
Rack
U.D. 1
U.D. 2
Amp Manager II
Area-1
001 FOH Left
001 High
001 : 1/2
001 : 001 Tx6n CH1
001 : 002 Tx6n CH2
002 : 3/4
001 Mid
001 Low
002 FOH Right
003 Delay Left

TREE REPRESENTATION EXAMPLE
(FEED STRUCTURE)

TREE REPRESENTATION EXAMPLE
(DEVICE TREE)

REMOTE AUDIO AMPLIFIER MONITORING SYSTEM

BACKGROUND OF THE INVENTION

1. Technical Field

The present invention relates to a remote monitoring apparatus, method and program that monitors an operation state of a plurality of audio amplifiers connected to a network.

2. Background Art

A professional audio system is known that is used in a sound reinforcement system (also known as a public address or PA system) in a concert hall, or that is used for a music production. In the audio system, there are increasing cases where a number of audio amplifiers are used therewith, and therefore, a monitoring system is used in order to monitor the respective audio amplifiers to know whether or not the audio amplifiers in the audio system are operating normally. In such a case, the audio system is networked so that the audio amplifiers to be monitored are connected to a network, and the monitoring system collects from the respective audio amplifiers, status information representing the operation state of the audio amplifier, and displays the collected status information in a display device.

The prior monitoring system is configured to display a list of all the audio amplifiers present on a network or to display the audio amplifiers in a tree representation. Then, the monitoring system selects an audio amplifier to be monitored from the list or the tree representation of the audio amplifiers displayed in the display deice, and displays the status information of the selected audio amplifier in the display device, thereby monitoring the operation state of the audio amplifier.

However, when the list or the tree representation of the audio amplifiers is displayed in the display device, the audio amplifiers are displayed on the order of a device ID (identification) number that identifies a device. Therefore, it is difficult to know a location or a performance of the respective audio amplifiers in a concert hall or a theater and a location or a performance of a speaker through which an audio output of an audio amplifier is emitted. Accordingly, it takes much labor and time to locate an audio amplifier to be monitored from the list or the tree representation displayed in the display device. It is particularly difficult to locate an audio amplifier to be monitored when tens or hundreds of audio amplifiers are used in the audio system installed in a place such as a concert hall or a theater.

SUMMARY OF THE INVENTION

An object of the present invention is, therefore, to provide a remote audio amplifier monitoring system and program capable of providing a graphic representation that enables easy locating of an audio amplifier to be monitored.

In order to attain such an object, according to the present invention, an apparatus is provided for remotely monitoring a plurality of amplifiers on a display device, the amplifiers being provided to process audio signals and being directly or indirectly connected to a network. The inventive apparatus comprises: a selecting section for selecting one of a plurality of groupings of amplifiers, each amplifier allocated to at least a first and second grouping and having at least a first and second group code corresponding to the first and second grouping; a collecting section that collects a group code corresponding to the selected grouping from each of the amplifiers through the network; and a display control section that displays a tree diagram of the amplifiers according to the collected group codes on the display device as a graphical representation of the selected grouping.

Preferably, the display control section selects one of the first grouping and the second grouping so as to display the tree diagram of the amplifiers corresponding to the selected one of the first grouping and the second grouping.

Preferably, the first grouping groups the plurality of the amplifiers based on locations of the respective amplifiers, and the second grouping groups the plurality of the amplifiers based on performances of the respective amplifiers, and the display control section displays the tree diagram of the amplifiers sorted in terms of the locations thereof when the first grouping is selected, and displays the tree diagram of the amplifiers sorted in terms of the performances thereof when the second grouping is selected.

Preferably, each amplifier has one or more of channels for processing the audio signals separately from each other, and the first group code is allocated singularly to the amplifier, while the second group code is allocated to each of the channels of the amplifier.

Preferably, one of the amplifiers is selected from the tree diagram of the amplifiers on the display device, the collecting section acquires status information from the selected amplifier through the network, and the display control section displays an operating state of the selected amplifier according to the acquired status information.

Preferably, each of the first grouping and the second grouping comprises two or more layers and the first group code and the second group code comprises two or more corresponding group numbers.

According to the present invention, it is possible to locate an audio amplifier to be monitored in an easy manner in that a group code, which is information representing a group to which respective amplifiers belong, is collected from the respective amplifiers, whereby a tree representation of a plurality of amplifiers that is connected directly, or indirectly, to a network is displayed in a display device in accordance with the collected group code, and that the plurality of amplifiers are grouped into a plurality of groups having different viewpoints wherein they are grouped from the viewpoint of a location or a performance of a rack on which the amplifiers are mounted, or of the speakers connected to the amplifiers, whereby the tree representation is displayed in the display device in accordance with the viewpoint of either one of the grouping systems.

According to the present invention, the collecting section at least collects a first group code and a second group code, from a plurality of amplifiers that is at least grouped into a first group wherein they are grouped from the viewpoint of an amplifier's location and a second group wherein they are grouped from the viewpoint of an amplifier's performance, the first group code being capable of representing the location of the respective amplifiers by a location of a rack on which the amplifiers are mounted while the second group code being capable of representing the performance of the respective amplifiers by a performance of the speakers to which the amplifiers are connected, whereby when a tree representation of either one of the groups is selected, a display device displays the tree representation of the plurality of amplifiers in accordance with the group code corresponding to the selected grouping system, in accordance with the group codes collected by the collecting section. With such a configuration, it is possible to provide a tree representation suitable for the purpose of use and to thus locate an amplifier to be monitored from the displayed tree representation in an easy manner.

Therefore, it is possible to simplify the selection of the amplifier to be monitored and to thus save labor and time in monitoring the amplifiers.

DETAILED DESCRIPTION OF THE INVENTION

Figure 1:
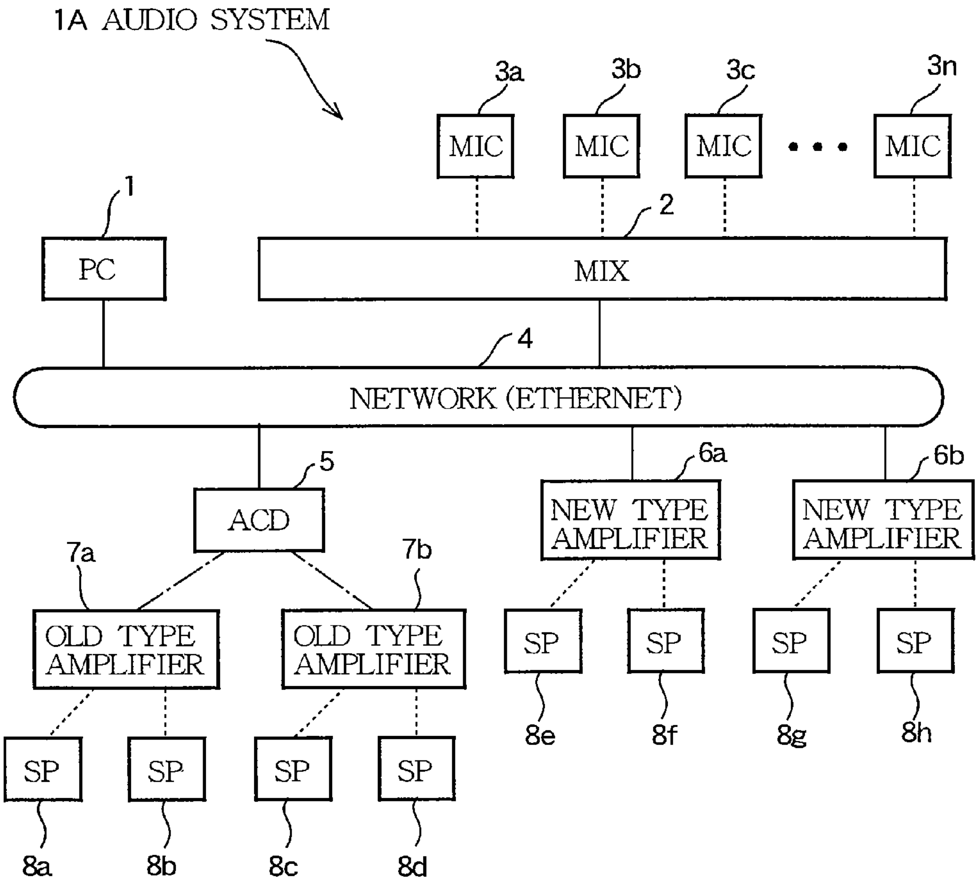
FIG. 1 is a block diagram illustrating the construction of an audio system which is equipped with a remote monitoring apparatus according to an embodiment of the present invention.

Referring to FIG. 1, a block diagram illustrates the construction of an audio system 1A which is equipped with a remote monitoring apparatus according to an embodiment of the present invention.

The audio system 1A shown in FIG. 1 includes a network 4 to which a personal computer (PC) 1 serving as the remote monitoring apparatus is connected. The network 4 is constructed by the generally used Ethernet. The remote monitoring program according to the embodiment of the present invention is installed in the PC 1, and when the remote monitoring program is activated in the PC 1, it is possible to monitor all the amplifiers of the audio system 1A over the network 4. In such a case, new type amplifiers 6*a* and 6*b* and old type amplifiers 7*a* and 7*b*, each of which is an audio amplifier, are provided in the audio system 1A. The new type amplifiers 6*a* and 6*b* have an interface that enables them to be connected to the network 4 and thus are directly connected to the network 4. On the other hand, the old type amplifiers 7*a* and 7*b* do not have an interface that enables them to be connected to the network 4 and thus are unable to connect to the network 4. Therefore, an ACD (Amplifier Control Device) 5 is connected between the old type amplifiers 7*a* and 7*b* and the network 4 so that relaying of the old type amplifiers 7*a* and 7*b* to the network 4 is carried out by the ACD 5. With such a configuration, the PC 1 can monitor the new type amplifiers 6*a* and 6*b* and the old type amplifiers 7*a* and 7*b*, that is, all the amplifiers of the audio system 1A over the network 4.

Hereinafter, the details of the operation of the PC 1 monitoring all the amplifiers of the audio system 1A over the network 4 will be described.

The network 4 of FIG. 1 utilizes Ethernet which is one computer network protocol, and the Ethernet is specified on the physical layer and the data link layer, which are the lowest two layers of the OSI reference model. Moreover, the network 4 may be constructed by a local area network (LAN) incorporating the Ethernet protocol and the TCP/IP protocols. In the network 4, a mixer (MIX) 2 that mixes audio signals from microphones 3*a*, 3*b*, 3*c*, . . . , and 3*n*, the ACD (amplifier control device) 5, which is a device for connecting to the network 4, the old type amplifiers 7*a* and 7*b* not having an interface (Ethernet terminal) connectable to the network 4, and the new type amplifiers 6*a* and 6*b* having an Ethernet terminal connectable to the network 4 are connected to each other through corresponding Ethernet cables.

Although the old type amplifiers 7*a* and 7*b* do not have an Ethernet terminal, they have a serial port, so the old type amplifiers 7*a* and 7*b* and the ACD 5 can communicate with each other via serial cables connected to their corresponding serial ports. That is, the ACD 5 performs serial-to-Ethernet conversion to thereby connect the old type amplifiers 7*a* and 7*b* to the network 4. In such a case, the old type amplifiers 7*a* and 7*b* appear to be connected to the network 4 as viewed from the network 4. Moreover, the microphones 3*a* to 3*n* are connected to the MIX 2 through corresponding audio cables. Furthermore, speakers (SP) 8*a* and 8*b* are connected to the old type amplifier 7*a* through corresponding audio cables, and speakers (SP) 8*c* and 8*d* are connected to the old type amplifier 7*b* through corresponding audio cables. Furthermore, speakers (SP) 8*e* and 8*f* are connected to the new type amplifier 6*a* through corresponding audio cables, and speakers (SP) 8*g* and 8*h* are connected to the new type amplifier 6*b* through corresponding audio cables. In the audio system 1A shown in FIG. 1, respective blocks correspond to devices, and these blocks are arranged spatially located within a concert hall.

Between devices of the audio system 1A, audio signals are delivered through audio cables, and control information is delivered over the network 4. That is, although not shown in the drawing, the MIX 2 and the new type amplifiers 6*a* and 6*b* and the old type amplifiers 7*a* and 7*b* are connected to each other through audio cables. Through the audio cables, the audio signals from the microphones 3*a* to 3*n* are input to and mixed in the MIX 2, and the mixed outputs are supplied from the MIX 2 to the new type amplifiers 6*a* and 6*b* and the old type amplifiers 7*a* and 7*b*. Moreover, the audio signals output from the new type amplifiers 6*a* and 6*b* and the old type amplifiers 7*a* and 7*b* are supplied through the audio cables to the speakers 8*a* to 8*h* and are emitted to the outside.

The network 4 to which the PC 1, the MIX 2, the ACD 5, and the new type amplifiers 6*a* and 6*b* are connected is a hub of the Ethernet, and unique IP addresses are respectively set by the network 4 to the PC 1, the MIX 2, the ACD 5, the new type amplifier 6*a*, and the new type amplifier 6*b*. The control information is delivered over the network 4, and the control information is transferred between the PC 1, the ACD 5, and the new type amplifiers 6*a* and 6*b*. Examples of the transferred control information include information on a device ID (identification) and a device name of the ACD 5 and the new type amplifiers 6*a* and 6*b* necessary for performing the Ethernet communication, information on a group code of a group to which a device belongs, and status information that represents an operation state of a device. Here, the remote monitoring program is installed in the PC 1, and therefore, when the remote monitoring program is activated in the PC 1, the PC 1 issues a request via the network 4 for acquiring the device information from the ACD 5 and the new type amplifiers 6*a* and 6*b*, which are devices connected to the network 4. Then, the PC 1 creates a project file based on the device information received from the devices via the network 4 in response to the request. In this case, the device information of the ACD 5 contains therein the device information of the old type amplifiers 7*a* and 7*b*, acquired through a serial communication with the old type amplifiers 7*a* and 7*b*. The project file is composed of device information and a group name. There is a plurality of amplifier groups having different viewpoints: a grouping system wherein amplifiers are grouped from the viewpoint of an amplifier's location; a grouping system wherein amplifiers are grouped from the viewpoint of an amplifier's performance; and a user defined grouping system wherein amplifiers are grouped from the viewpoint of a user's definition. As the grouping system wherein amplifiers are grouped from the viewpoint of the amplifier's location, a rack grouping system wherein amplifiers are grouped from the viewpoint of a rack on which the amplifiers are mounted can be exemplified. As the grouping system wherein amplifiers are grouped from the viewpoint of the amplifier's performance or role, a feed structure grouping system wherein amplifiers are grouped from the viewpoint of the performance of the speakers connected to the amplifiers is exemplified. The group name of these groups may be configured on the PC 1.

In this manner, the grouping of the amplifiers into a plurality of amplifier groups having different viewpoints is based on at least the following reason. Although the audio system 1A shown in FIG. 1 has a total of four amplifiers, tens or hundreds of audio amplifiers may be used in an audio system installed in a place such as a concert hall or a theater. Therefore, by grouping the amplifiers from different viewpoints, it is possible to easily find a target amplifier.

Moreover, when the remote monitoring program is activated and the project file is created in the PC 1, all the amplifiers to be monitored, present on the network 4 are displayed in a tree diagram form, and in this case, a grouping system of amplifiers which are grouped from the viewpoint of a default feature or a selected feature are displayed in a tree representation form. During the display, the group code of the group selected from the entire amplifiers to be monitored is extracted from the project file by the PC 1, and thus, a group of amplifiers to be monitored are displayed in a tree representation form in accordance with the group code. Hereinafter, details of the tree representation displayed in accordance with the viewpoint of the group will be described.

Figure 2:
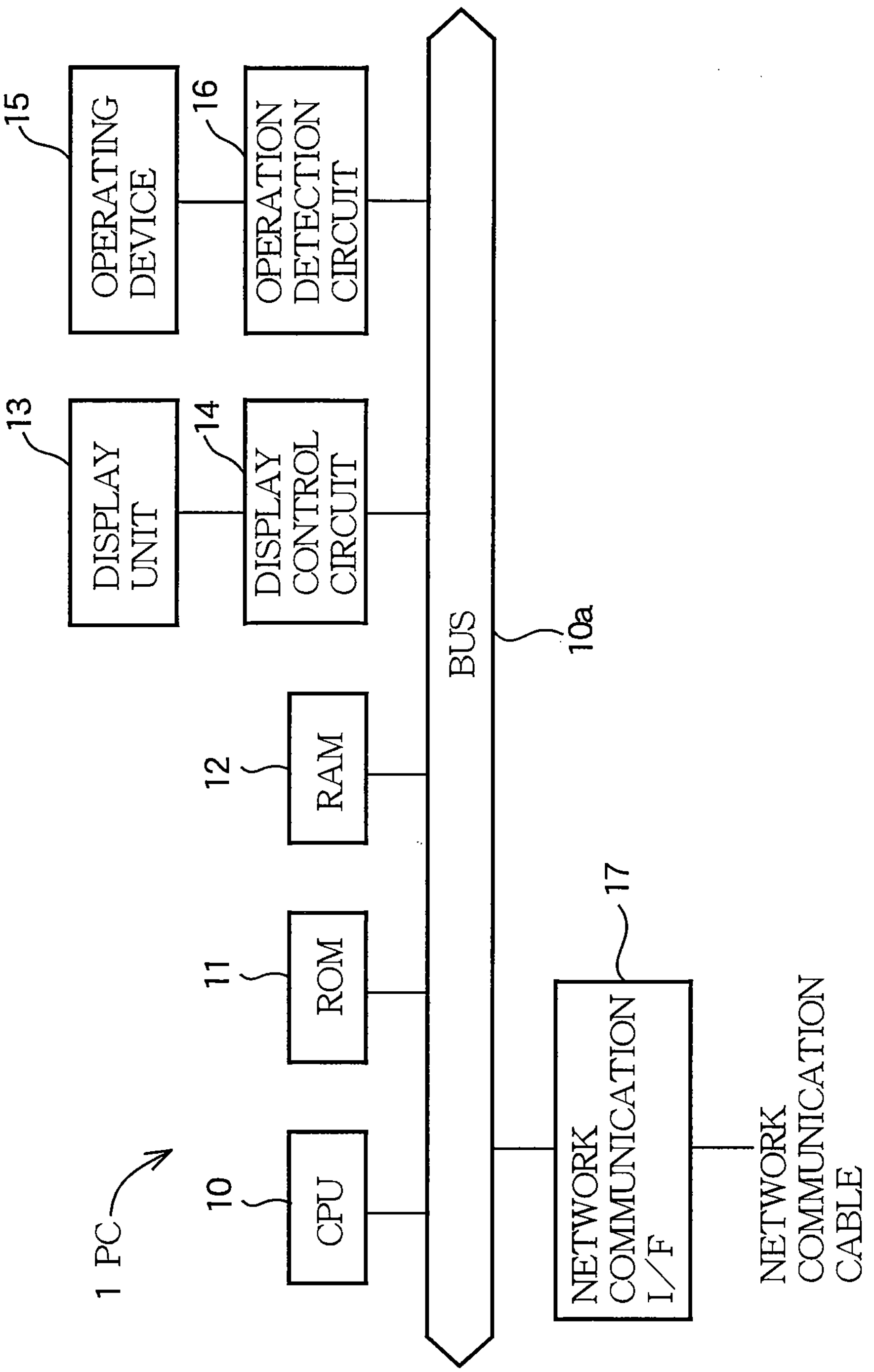
FIG. 2 is a block diagram illustrating the construction of a personal computer (PC) as the remote monitoring apparatus according to the present invention.

Referring first to FIG. 2, a block diagram is shown illustrating the construction of the PC 1.

In FIG. 2, a CPU (central processing unit) 10 controls the overall operation of the PC 1 and executes operation software such as the remote monitoring program and control program. In a ROM (read only memory) 11, the operation software such as the remote monitoring program or the control program executed by the CPU 10 is stored. In a RAM (random access memory) 12, work areas of the CPU 10 or memory areas for memorizing the device information for remote monitoring or the status information acquired from the devices are specified. When the ROM 11 is configured as a rewritable ROM such as a flash memory, rewriting of the operation software is allowed, and the version-up of the remote monitoring program or the operation software is facilitated. Moreover, although not shown in the drawing, a large-capacity storage device such as a hard disc drive is provided, and basic software such as a operation system or software such as application program is stored in the large-capacity storage device.

A display control circuit 14 displays an application screen of an activated application in a display unit 13 such as liquid crystal display (LCD) device, and a monitoring screen is displayed in the display unit 13 when the remote monitoring program is activated. An operation detection circuit 16 scans an operating device 15 such as a keyboard or a mouse provided to the PC 1 to thereby detect an operation event of the operating device 15 and outputs an event output corresponding to the operating device 15 that made the input operation event. A network communication interface (I/F) 17 is an Ethernet interface that is connected through a network communication cable (Ethernet cable) to the network 4 and performs a communication with devices existing on the network 4, whereby the PC 1 can transfer the device information and the status information from the devices. Via the interface 17, the PC 1 and the devices are logically connected to each other. The respective parts are connected to a bus 10*a* so that they can perform data transfer via the bus 10*a*.

Figure 3:
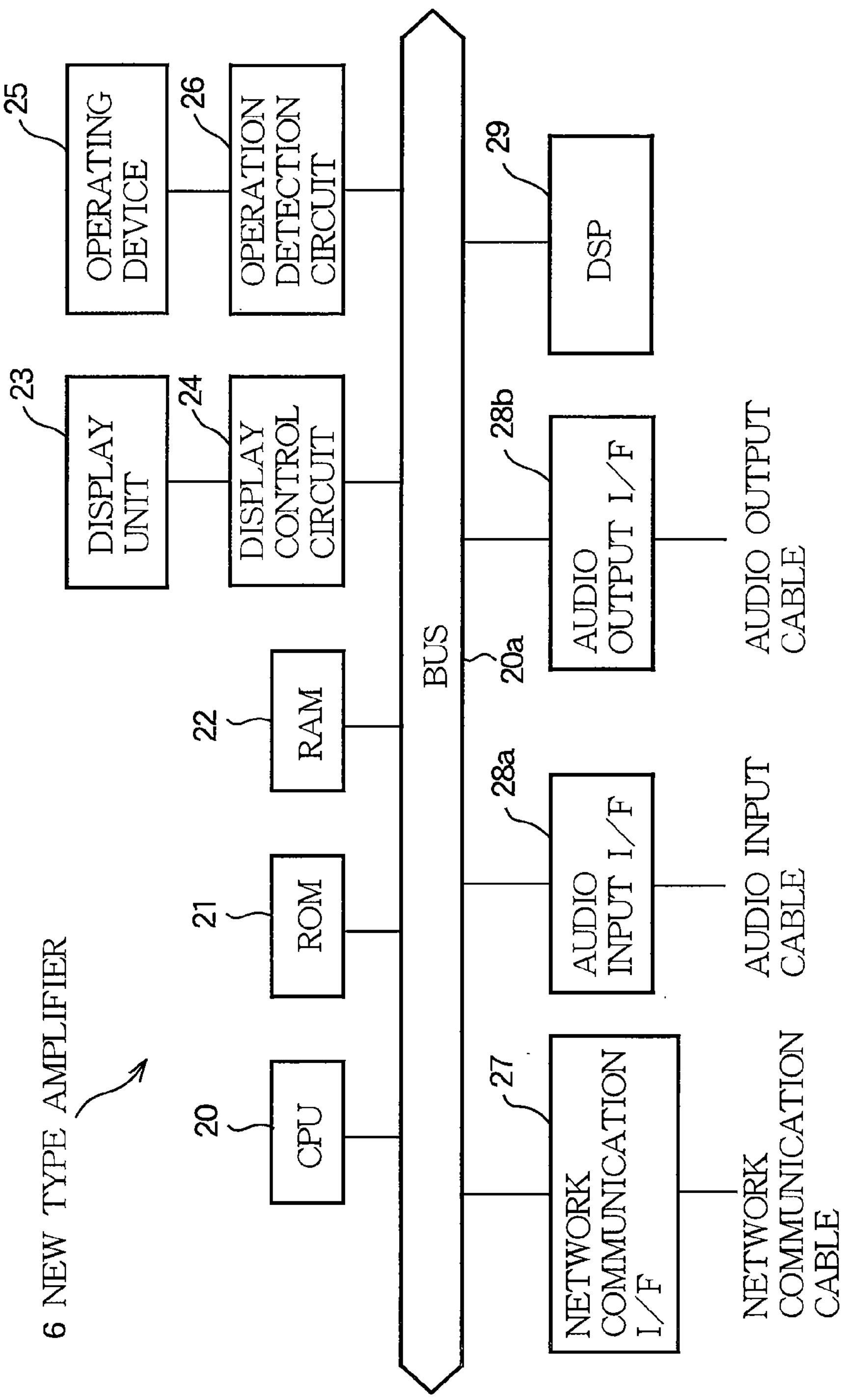
FIG. 3 is a block diagram illustrating the construction of a new type amplifier in the audio system according to the present invention.

Referring now to FIG. 3, a block diagram is shown illustrating the construction of the new type amplifier 6.

In FIG. 3, a CPU 20 controls the overall operation of the new type amplifier 6 and executes operation software such as amplifier control program. In a ROM 21, the operation software such as the amplifier control program executed by the CPU 20 is stored. In a RAM 22, work areas of the CPU 20 or memory areas for memorizing data such as its own device information or the status information are specified. When the ROM 21 is configured as a rewritable ROM such as a flash memory, rewriting of the operation software is allowed, and the version-up of the operation software is facilitated. A display control circuit 24 displays input and output levels, an amplifier setting screen, or the like in a display unit 23 such as liquid crystal display (LCD). An operation detection circuit 26 scans an operating device 25 such as an attenuator provided to the new type amplifier 6 to thereby detect an operation event of the operating device 25 and outputs an event output signal corresponding to the operating device 25 that made the event.

A network communication interface (I/F) 27 is an Ethernet interface that is connected through a network communication cable (Ethernet cable) to the network 4. Via the interface 27, and the new type amplifier and the PC 1 are logically connected to each other. An audio input interface (I/F) 28*a* is an interface via which audio signals are input, and is connected through an audio input cable to the MIX 2 so that the audio signals are input from the MIX 2. An audio output interface (I/F) 28*b* is an interface via which audio signals amplified by the new type amplifier 6 are output to a speaker, and is connected through an audio output cable to the speaker so that the audio signals are emitted through the speaker. A DSP (digital signal processor) 29 performs signal processing for amplifying input audio signals or dividing a frequency band under the control of the CPU 20. Moreover, the impedance values of the speakers are monitored, and thus, the operation states of the speakers can be identified by the impedance values. The respective parts are connected to a bus 20*a* so that they can perform data transfer via the bus 20*a*.

Figure 4:
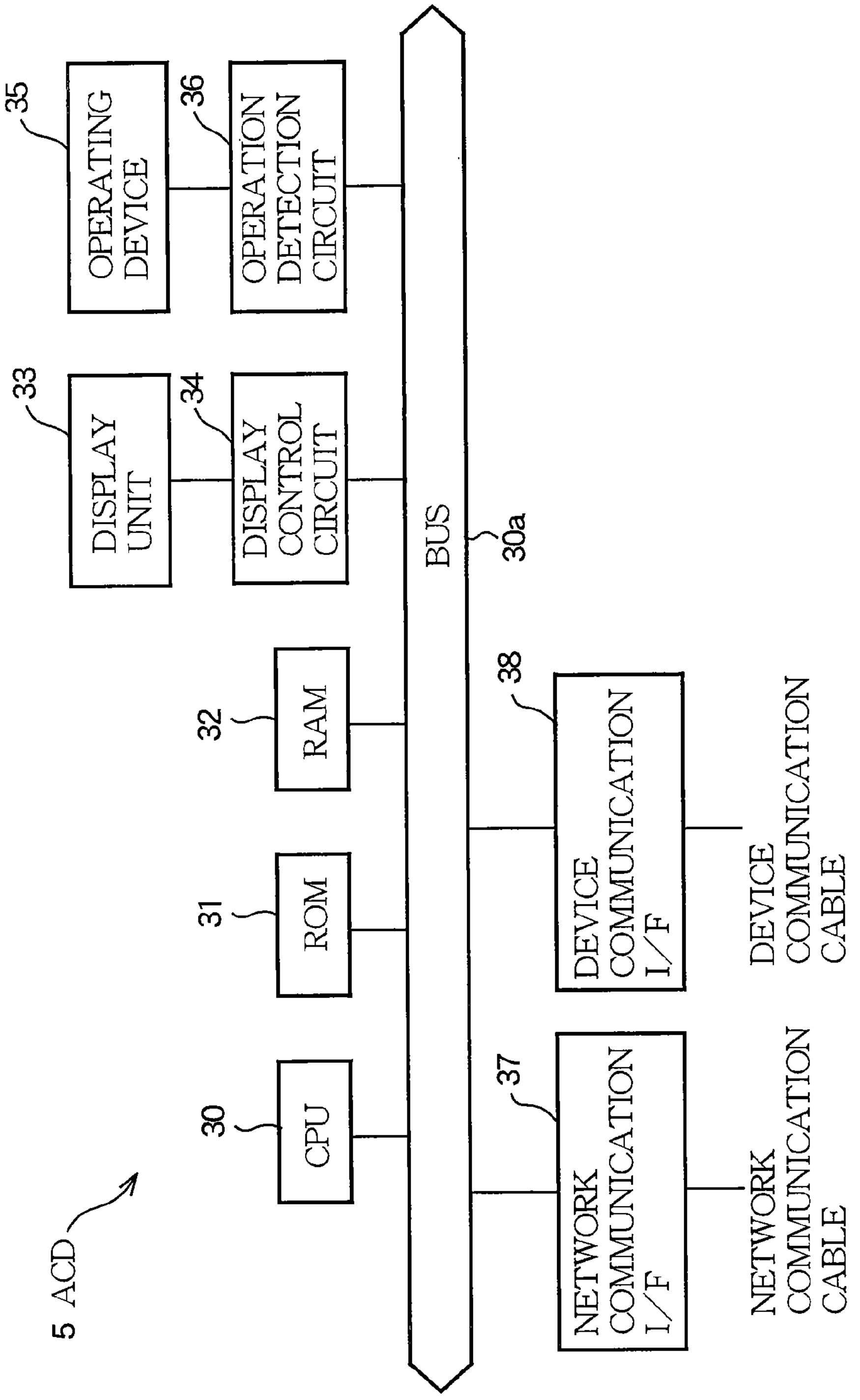
FIG. 4 is a block diagram illustrating the construction of an ACD in the remote monitoring apparatus according to the present invention.

Referring now to FIG. 4, a block diagram is shown illustrating the construction of the ACD 5.

In FIG. 4, a CPU 30 controls the overall operation of the ACD 5 and executes operation software such as serial-to-Ethernet conversion program. In a ROM 31, the operation software such as the conversion program executed by the CPU 30 is stored. In a RAM 32, work areas of the CPU 30 or memory areas for memorizing data such as the device information or the status information acquired from the old type amplifiers 7*a* and 7*b* are specified. When the ROM 31 is configured as a rewritable ROM such as a flash memory, rewriting of the operation software is allowed, and the version-up of the operation software is facilitated. A display control circuit 34 displays a conversion control setting screen in a display unit 33 such as liquid crystal display (LCD). An operation detection circuit 36 scans an operating device 35 provided to the ACD 5 to thereby detect an operating event of the operating device 35 and outputs an event output signal corresponding to the operating device 35 that made the event.

A network communication interface (I/F) 37 is an Ethernet interface that is connected through a network communication cable (Ethernet cable) to the network 4. Via the interface 37, the ACD and the PC 1 are logically connected to each other. A device communication interface (I/F) 38 is a serial communication interface, and is connected through a device communication cable (serial cable) to the old type amplifiers 7*a* and 7*b* not having an Ethernet terminal. The respective parts are connected to a bus 30*a* so that they can perform data transfer via the bus 30*a*.

Figure 5:
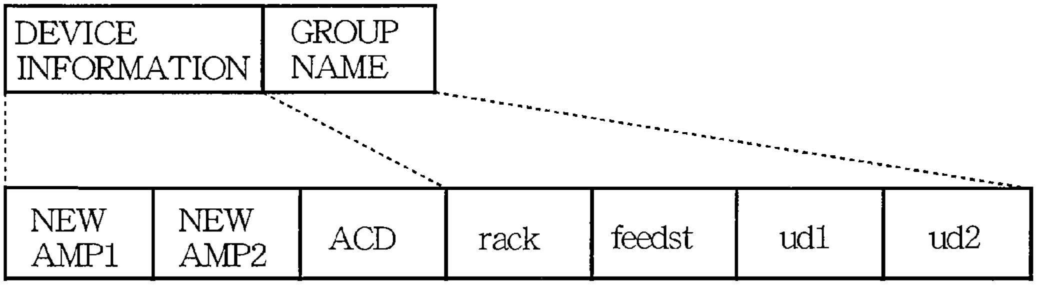
FIG. 5 is a diagram showing a data structure of a project file in the audio system according to the present invention.

Referring now to FIG. 5, there is shown a data structure of the project file created by the PC 1 when the remote monitoring apparatus is activated. The project file shown in FIG. 5 is a project file corresponding to one network system.

As shown in FIG. 5, the project file is composed of the device information acquired from the new type amplifiers 6*a* and 6*b* and the ACD 5 connected to the network 4 and a group name. That is, as shown in FIG. 5, the device information is composed of "New amp1 (new type amplifier 6*a*)," "New amp2 (new type amplifier 6*b*)," and "ACD," and the group name is composed of "rack," "feedst," "ud1," and "ud2." The grouping "rack" is a grouping system wherein amplifiers are grouped from the viewpoint of a rack on which the amplifiers are mounted, and the grouping "feedst" is a grouping system wherein amplifiers are grouped from the viewpoint of a feed structure based on the location or the performance of the speakers connected to the amplifiers. Moreover, the groupings "ud1" and "ud2" are grouping systems wherein amplifiers are grouped from the viewpoint of a user's definition. In such a case, when an amplifier to be monitored belongs to a third layer of the grouping system, the group name is composed of [first layer name], [second layer name], and [third layer name].

Figure 6:
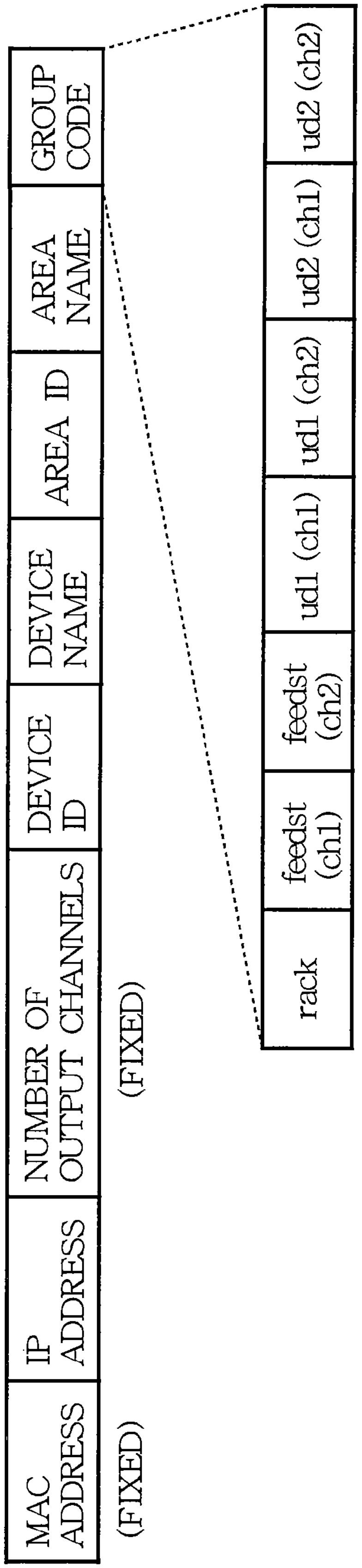
FIG. 6 is a diagram showing a data structure of device information of the new type amplifier in the audio system according to the present invention.

Referring now to FIG. 6, there is shown a data structure of the device information of "New amp1 (new type amplifier 6*a*)" and "New amp2 (new type amplifier 6*b*)" in the project file. Since the device information of New amp1 and New amp2 has the same data structure, the new type amplifiers 6*a* and 6*b* will be denoted by a new type amplifier 6, and the device information corresponding to the one new type amplifier 6 will be illustrated. Moreover, this device information is also recorded in the new type amplifiers 6*a* and 6*b*.

As shown in FIG. 6, the device information of the new type amplifier 6 contains therein a MAC address, which is a unique, fixed identification number allocated to each device and an IP address, which is 32-bits address information for use in an IP (internet protocol) protocol. During data transfer, a destination device can be designated by use of the MAC address and the IP address. Moreover, the device information contains therein a device ID that represents a fixed number of output channels possessed by the new type amplifier 6 and the type of the new type amplifier 6, a device name, an area ID of an area to which the new type amplifier 6 belongs, an area name of the area, and a group code. Examples of the group code when the new type amplifier 6 has two channels are shown in FIG. 6, in which the group code is composed of the respective group codes of grouping "rack," grouping "feedst (ch1)," grouping "feedst (ch2)," group "ud1 (ch1)," grouping "ud1 (ch2)," grouping "ud2 (ch1)", and grouping "ud2 (ch2)." In such a case, when the new type amplifier 6 belongs to a third layer of any grouping, the group code is composed of [first layer number], [second layer number], and [third layer number].

Figure 7:
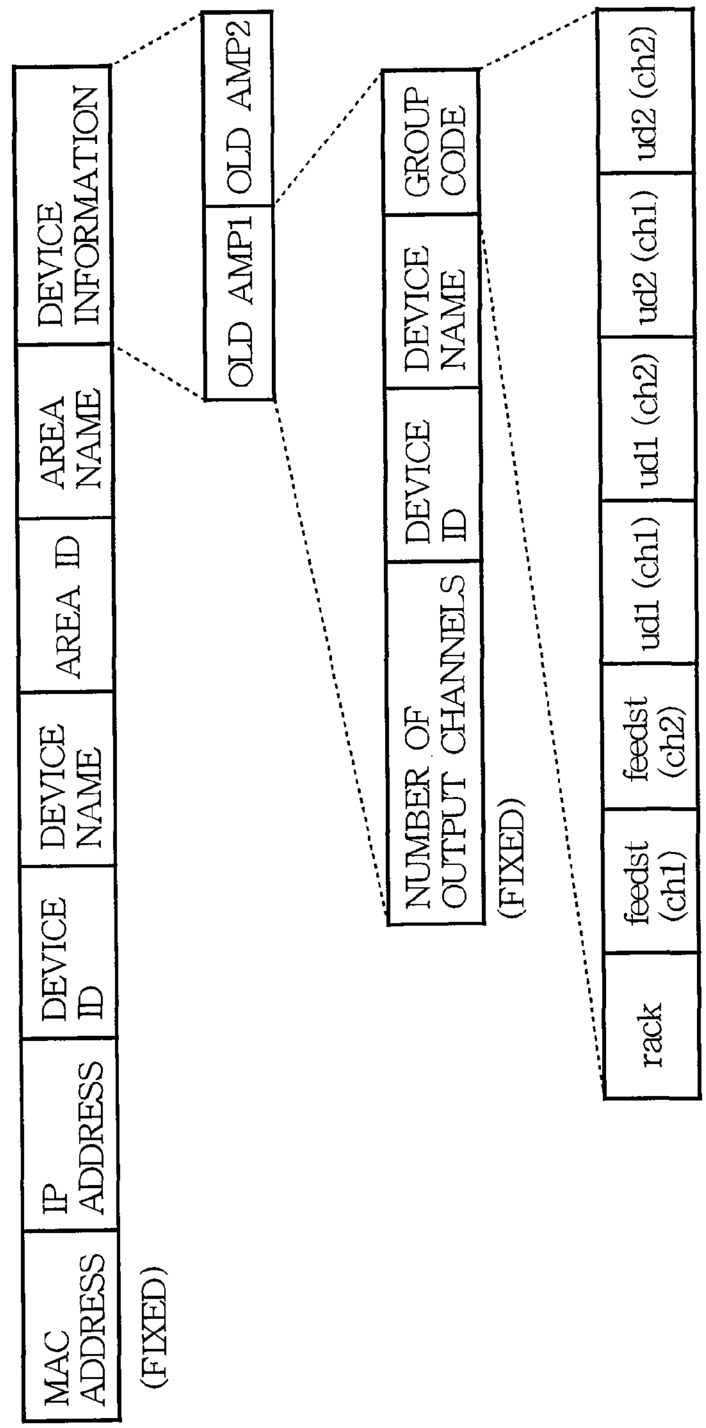
FIG. 7 is a diagram showing a data structure of device information of the ACD in the audio system according to the present invention.

Referring now to FIG. 7, there is shown a data structure of the device information recorded in the ACD 5. The device information shown in FIG. 7 is device information corresponding to one ACD 5.

As shown in FIG. 7, the device information of the ACD 5 contains therein a MAC address, an IP address, a device ID, a device name, an area ID, an area name, and device information of the old type amplifier 7 connected to the ACD 5. In such a case, when the audio system 1A has the construction shown in FIG. 1, the device information corresponds to the device information of "Old amp1 (old type amplifier 7*a*)" and "Old amp2 (old type amplifier 7*b*)." Since the device information of Old amp1 and Old amp2 has the same data structure, only the data structure of the device information of Old amp1 is illustrated in FIG. 7.

The device information of Old amp1 contains therein a device ID that represents a fixed number of output channels possessed by the old type amplifier 7*a* and the type of the old type amplifier 7*a*, a device name, an area ID of an area to which the old type amplifier 7*a* belongs, an area name of the area, and a group code. Examples of the group code when the old type amplifier 7*a* has two channels are shown in FIG. 7, in which the group code is composed of the respective group codes of grouping "rack," grouping "feedst (ch1)," grouping "feedst (ch2)," grouping "ud1 (ch1)," grouping "ud1 (ch2)," grouping "ud2 (ch1)", and grouping "ud2 (ch2)." In such a case, when the old type amplifier 7*a* belongs to a third layer of any grouping, the group code is composed of [first layer number], [second layer number], and [third layer number.].

Figure 8:
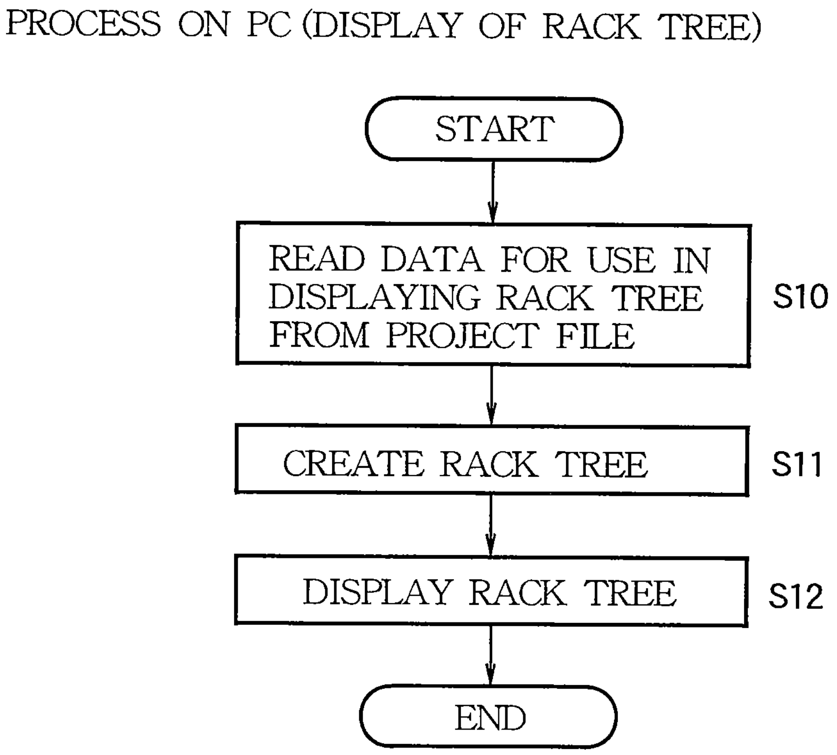
FIG. 8 is a flow chart illustrating a rack tree display process executed by the remote monitoring apparatus according to the present invention.

Referring now to FIG. 8, there is shown a flow chart illustrating a rack tree display process executed by the PC 1.

A rack tree display process is activated when a rack tree representation that displays a tree representation of the grouping "rack" wherein amplifiers are grouped from the viewpoint of an amplifier's location is selected in the monitoring screen displayed in the display unit 13 of the PC 1. In step S10, data for displaying a rack tree diagram are read out from the project file. That is, information such as "device ID," "device name," "area ID," "area name," and "group code" is extracted from the device information of "New amp1 (new type amplifier 6*a*)" and "New amp2 (new type amplifier 6*b*)" within the device information in the project file. Here, the group code allocated according to the grouping "rack" is extracted, and the extracted group code indicates a rack to which the amplifier belongs.

Moreover, information such as "device ID," "device name," "area ID," "area name," and "device information" is extracted from the device information of "ACD" within the device information. This device information corresponds to the device information of "Old amp1 (old type amplifier 7*a*)" and "Old amp2 (old type amplifier 7*b*)," and information such as "device ID," "device name," and "group code" is extracted from the device information of "Old amp1 (old type amplifier 7*a*)" and "Old amp2 (old type amplifier 7*b*)." Here, the group code allocated according to the grouping "rack" is extracted, and it is possible to identify a rack to which the amplifier belongs from the extracted group code.

Subsequently, a rack tree diagram is created in step S11. In this step, by referring to the area ID from the information extracted in step S10, amplifiers are grouped into an amplifier group having the same area ID and thus belonging to the same area, and by referring to the respective group codes of the amplifiers belonging to each area, amplifiers are grouped into an amplifier group belonging to a first layer. Such grouping of an amplifier group for any subsequent layer is performed, and amplifiers belonging to each rack are aligned on the order of the device name, whereby the rack tree is created. Then, the created rack tree diagram is displayed in the display unit 13 in step S12, whereby the rack tree display process is completed. When displaying the rack tree, the extracted "group code" is converted into the group name corresponding to the group code read out from the project file, and thus the group name of each layer is displayed.

Figure 9:
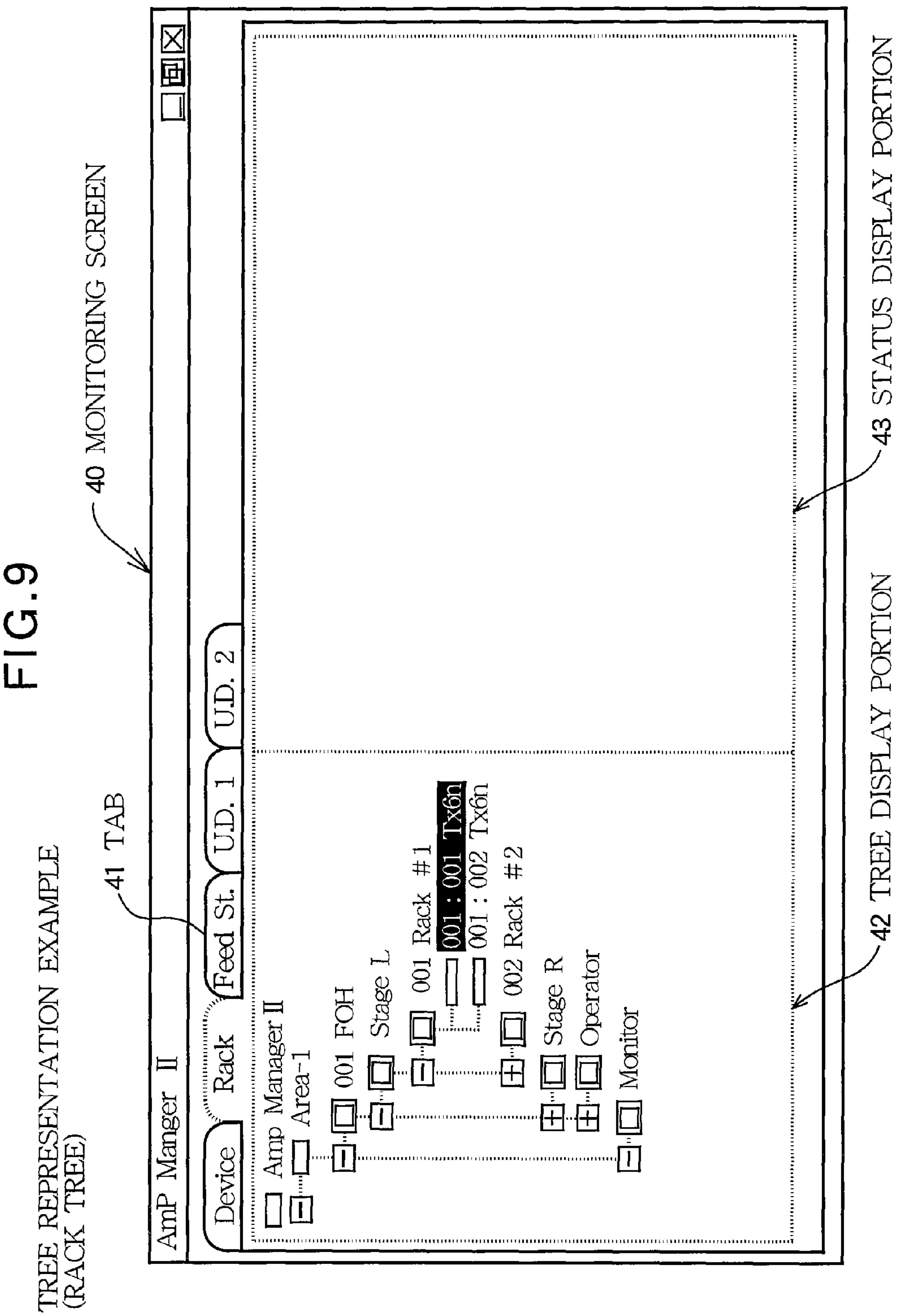
FIG. 9 is a diagram illustrating a representation example of a rack tree displayed in the remote monitoring apparatus according to the present invention.

Referring to FIG. 9, there is shown a representation example of the rack tree displayed in the display unit 13 when the rack tree display process is performed.

As shown in FIG. 9, a monitoring screen 40 includes a display portion including a tree display portion 42 and a status display portion 43, and a plurality of tabs 41 for selecting a tree type for display in the tree display portion 42. In FIG. 9, a "Rack" tab 41 is selected as the tree type and thus the above-described rack tree display process is performed, and the rack tree is displayed in the tree display portion 42. In the tree display portion 42, an amplifier group belonging to an area having an area name "Area-1" is displayed in a tree representation, and there are two groups on a first layer of the tree representation, respectively having group names "001 FOH" and "Monitor." Moreover, the group "001 FOH" is expanded into three groups on a second layer, respectively having group names "Stage L," "Stage R," and "Operator." Here, "FOH" is an abbreviation of Front Of House, meaning an operator room located at the front of a stage or the like, and "Stage L" and "Stage R" mean the left and right sides of the stage. In this manner, it can be known that these groups are sorted in terms of the amplifier's location.

Moreover, the group "Stage L" is expanded into two groups on a third layer, respectively having group names "001 Rack #1" and "002 Rack #2." Furthermore, the group "001 Rack #1" is illustrated as being expanded into two elements, showing that two amplifiers "001: 001 Tx6n" and "001: 002 Tx6n" are belonging to the group "001 Rack #1." That is, it can be known that "001 Rack #1" and "001 Rack #2" are rack names and that two amplifiers "001: 001 Tx6n" and "001: 002 Tx6n" are mounted on the rack "001 Rack #1." Moreover, a prefix "001" in "001: 001 Tx6n" is a device ID of the amplifier, and "001 Tx6n" is a device name. In the rack tree representation, the amplifiers are not displayed for each channel. In this manner, since the rack tree representation allows displaying the amplifiers in groups for each of the locations of the racks to which the amplifiers belong, by navigating the groups from the higher layer group toward the lower layer groups, it is possible to find the amplifier to be monitored in an easy manner. When the found amplifier is selected (highlighted) as shown in FIG. 9, the operation state of the selected amplifier "001: 001 Tx6n" is displayed in the status display portion 43. Examples of an item displayed in the status display portion 43 include a power switch, input and output levels, and temperature of a heat sink of the selected amplifier. By monitoring these items, it is possible to know the operation state of the amplifier. Moreover, when an amplifier has a plurality of channels, the average, maximum, or minimum value of the displayed item is displayed. Furthermore, when a user clicks on a symbol, which is a combination of "□" and "+," in the rack tree representation shown in FIG. 9, the group is expanded to a lower layer and displayed in a tree representation.

Now, a specific example of the group code will be described with reference to the rack tree representation shown in FIG. 9. For example, the group code of the group "001 FOH" on the first layer of the tree representation is "1," and the group code of the group "Monitor" is "2." Moreover, the group code of the group "Stage L" on the second layer expanded from the group "001 FOH" is "1-1," the group code of the group "Stage R" is "1-2," and the group code of the group "Operator" is "1-3." Furthermore, the group code of the group "001 Rack #1" on the third layer expanded from the group "Stage L" is "1-1-1," and the group code of the group "002 Rack #2" is "1-1-2." When displayed in the tree display portion 42, the group codes are converted into the group name with reference to the list of group names in the project file.

Figure 10:
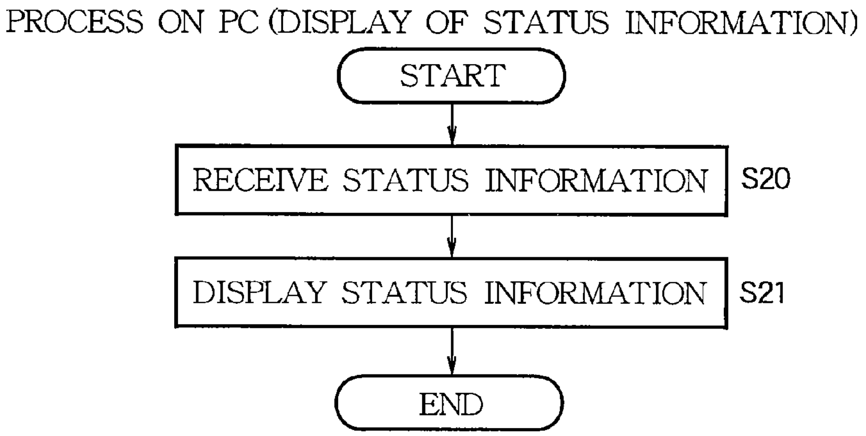
FIG. 10 is a flow chart illustrating a status information display process executed by the remote monitoring apparatus according to the present invention.
Figure 11:
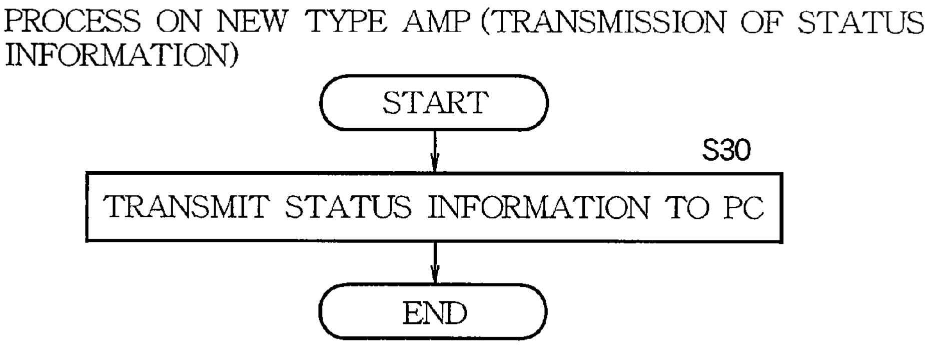
FIG. 11 is a flow chart of a status information transmission process executed by the new type amplifier in the audio system according to the present invention.
Figure 12:
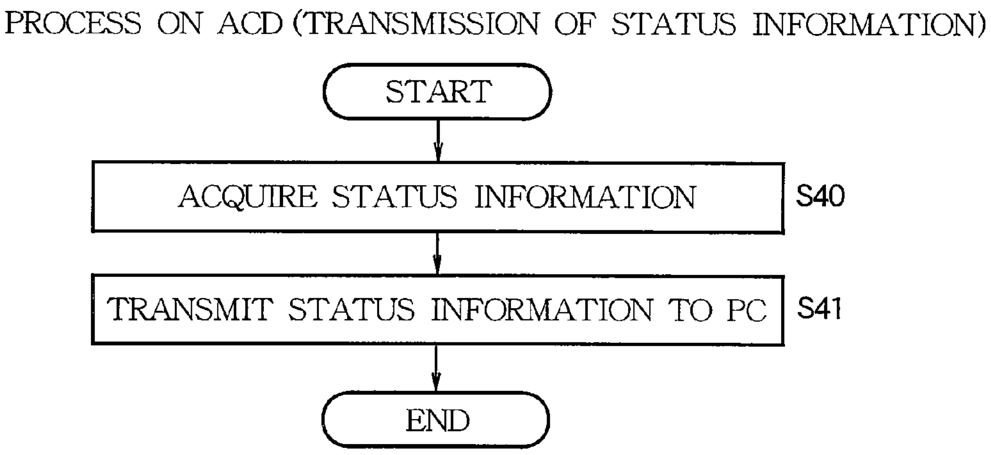
FIG. 12 is a flow chart of a status information transmission process executed by the ACD in the audio system according to the present invention.

However, the present invention is not limited to the rack tree representation. When one of the amplifiers displayed in the tree representation is selected in the tree display portion 42 of the monitoring screen 40, the operation state of the selected amplifier is displayed in the status display portion 43. In such a case, the PC 1 issues a status information request to the selected amplifier to thereby acquire the status information from the amplifier and displays the acquired status information in the status display portion 43. Referring to FIG. 10, there is shown a flow chart of a status information display process executed by the PC 1 when such a process is performed. Referring to FIG. 11, there is shown a flow chart of a status information transmission process executed by the new type amplifier when the selected amplifier is the new type amplifier 6*a* or the new type amplifier 6*b*. Referring to FIG. 12, there is shown a flow chart of a status information transmission process executed by the ACD 5 when the selected amplifier is the old type amplifier 7*a* or the old type amplifier 7*b*.

First, the status information transmission process shown in FIG. 11 will be described. This status information transmission process is activated by either one of the new type amplifier 6*a* or the new type amplifier 6*b* having received the status information request issued from the PC 1 to the new type amplifier 6*a* or the new type amplifier 6*b*. Once activated, the status information recorded on the new type amplifier per se is transmitted to the PC 1 in step S30, whereby the status information transmission process is completed.

The status information transmission process shown in FIG. 12 is activated by the ACD 5 when the status information request is issued from the PC 1 to the old type amplifier 7*a* or the old type amplifier 7*b*. Once activated, the status information is acquired from either one of the old type amplifier 7*a* or the old type amplifier 7*b* having received the request in step S40. Subsequently, the status information acquired in step S41 is transmitted to the PC 1, whereby the status information transmission process is completed.

The status information display process shown in FIG. 10 is activated when one of the amplifiers displayed in the tree representation is selected in the tree display portion 42 of the monitoring screen 40, and a status information transmission request is sent to the selected amplifier in step S20. In response to this step, the status information transmission process shown in FIG. 11 or 12 is performed, whereby the PC 1 receives the status information of the selected amplifier. Subsequently, the received status information is displayed in the status display portion 43 of the monitoring screen 40, whereby the status information display process is completed.

As the item displayed in the status display portion 43, in addition to the state of the power switch, the input and output levels, and the temperature of a heat sink of the selected amplifier, items such as a limiter operation by overinput, an operation of an output protection circuit, and an output load (impedance value of a speaker connected to an amplifier) may be displayed as well. By monitoring these items, it is possible to grasp the operation state of the amplifier. Moreover, in the status display portion 43, a user may be able to turn on or off a power switch, configure an attenuator, or turn on or off a mute switch.

Figure 13:
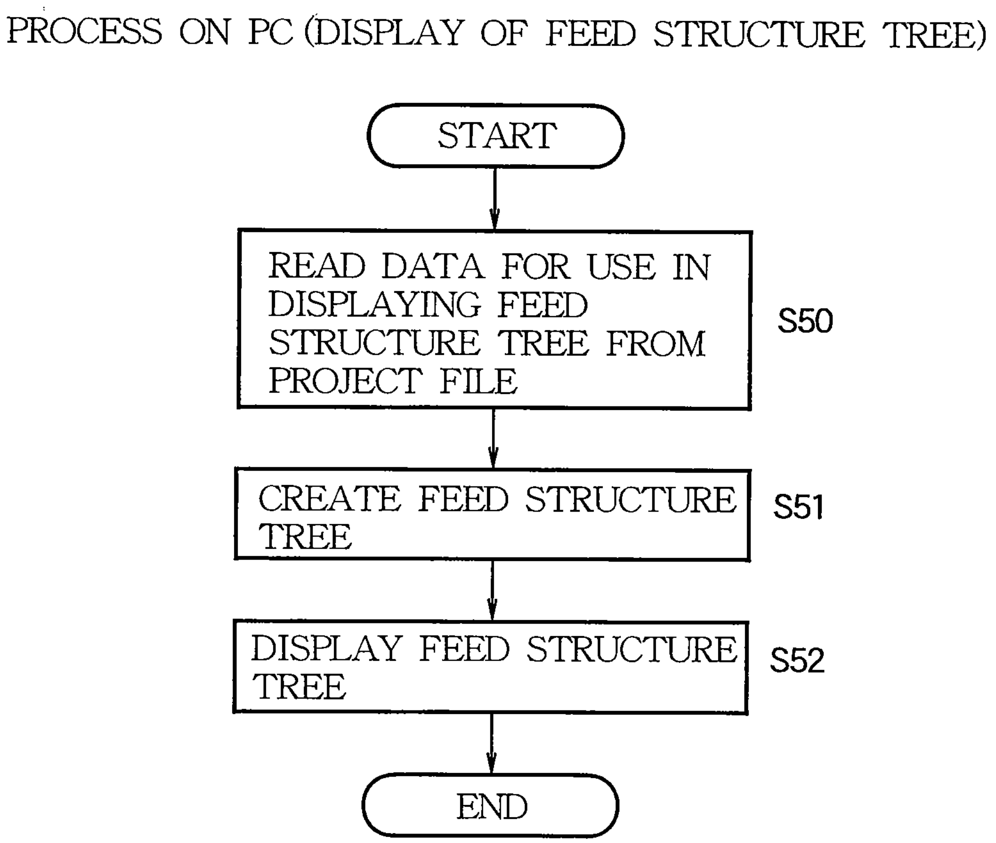
FIG. 13 is a flow chart of a feed structure tree display process executed by the remote monitoring apparatus according to the present invention.

Referring now to FIG. 13, there is shown a flow chart of a feed structure tree display process executed by the PC 1.

A feed structure tree display process is activated when a "FeedSt." tab 41 is selected in the monitoring screen 40 displayed in the display unit 13 of the PC 1, and thus a tree representation of the grouping "feedst" wherein amplifiers are grouped from the viewpoint of an amplifier's performance is displayed. In step S50, data for displaying a feed structure tree are read out from the project file. That is, information ranging from "device ID" to "group code" is extracted from the device information of "New amp1 (new type amplifier 6*a*)" and "New amp2 (new type amplifier 6*b*)" within the device information in the project file. Here, the group code allocated according to the grouping "feedst" is extracted for each channel, and from the extracted group code, it is possible to identify a speaker which is connected to the amplifier. Moreover, information ranging from "device ID" to "device information" is extracted from the device information of "ACD" within the device information. This device information corresponds to the device information of "Old amp1 (old type amplifier 7*a*)" and "Old amp2 (old type amplifier 7*b*)," and information ranging from "device ID" to "group code" is extracted from the device information of "Old amp1 (old type amplifier 7*a*)" and "Old amp2 (old type amplifier 7*b*)." Here, the group code allocated according to the grouping "feedst" is extracted for each channel, and from the extracted group code, it is possible to identify a speaker which is connected to the amplifier.

Subsequently, a feed structure tree is created in step S51. In this step, by referring to the area ID from the information extracted in step S50, amplifiers are grouped into an amplifier group having the same area ID and thus belonging to the same area, and by referring to the respective group codes of the amplifiers belonging to each area, amplifiers are grouped into an amplifier group belonging to a first layer. Such grouping of an amplifier group for any subsequent layer is performed, and amplifiers belonging to each of the last layers are arranged on the order of the device name and a channel number, whereby the feed structure tree in which a channel of an amplifier corresponds to each speaker is created. Then, the created feed structure tree is displayed in the display unit 13 in step S52, whereby the feed structure tree display process is completed. When displaying the feed structure tree, the extracted "group code" is converted into the group name corresponding to the group code read out from the project file, and thus the group name of each layer is displayed.

Figure 14:
FIG. 14 is a diagram illustrating a representation example of a feed structure tree displayed in the remote monitoring apparatus according to the present invention.

Referring now to FIG. 14, there is shown a representation example of the feed structure tree displayed in the display unit 13 when the feed structure tree display process is performed.

In the monitoring screen 40 shown in FIG. 14, the "FeedSt." tab 41 is selected as the tree type and thus the above-described feed structure tree display process is performed, and the feed structure tree is displayed in the tree display portion 42. In the tree display portion 42, an amplifier group belonging to an area having an area name "Area-1" is displayed in a tree representation, and there are three groups on a first layer of the tree representation, respectively having group names "001 FOH Left," "002 FOH Right," and "003 Delay Left." Moreover, the group "001 FOH Left" is expanded into three groups on a second layer, respectively having group names "001 High" for tweeter, "001 Mid" squawker, and "001 Low" for woofer. In this manner, it can be known that these groups are grouped by the amplifier's performance or role.

Moreover, the group "001 High" is expanded into two groups on a third layer, respectively having group names "001: 1/2" and "002: 3/4." Furthermore, the group "001: 1/2" is illustrated as being expanded into two elements, showing that two channels "001: 001 Tx6n CH1" and "001: 002 Tx6n CH2" are belonging to the group "001: 1/2." That is, it can be known that "001: 1/2" and "002: 3/4" are group names both having two channels and that the channel "001: 001 Tx6n CH1" of the amplifier "001: 1/2" is connected to a high speaker (tweeter) while the channel "001: 002 Tx6n CH2" is also connected to a high speaker (tweeter). Moreover, a prefix "001" in "001: 001 Tx6n CH1" is a device ID of the amplifier, "001 Tx6n" is a device name, and "CH1" is a channel number.

In this manner, in the feed structure tree representation, the amplifiers are displayed in the tree representation for each channel corresponding to the speaker. Since the feed structure tree representation allows displaying the amplifiers with the channel corresponding to the speaker, by navigating the groups from the higher layer group toward the lower layer groups, it is possible to find the amplifier to be monitored in an easy manner. When the found amplifier is selected (highlighted) as shown in FIG. 14, the state of the selected channel "001: 001 Tx6n CH1" is displayed in the status display portion 43. Examples of an item displayed in the status display portion 43 include a state o a power switch, input and output levels, and temperature of a heat sink of the selected amplifier. By monitoring these items, it is possible to know the operation state of the amplifier. Moreover, when a user clicks on a symbol, which is a combination of "□" and "+," in the feed structure tree representation shown in FIG. 14, the group is expanded to a lower layer and displayed in a tree representation.

Moreover, in the rack tree representation shown in FIG. 9 and the feed structure tree representation shown in FIG. 14, a dual rectangular icon is displayed in front of a group code of a group on each layer. The icon may be colored with different colors for each layer so that a user can easily know the layer to which the group belongs. Furthermore, since the ACD 5 is not displayed in the rack tree representation and the feed structure tree representation, it is possible to provide an easy-to-see representation.

In this way, in the PC 1 as the remote monitoring apparatus according to the present invention, a rack tree representation wherein amplifiers are grouped from the viewpoint of an amplifier's location (rack) and a feed structure tree representation wherein amplifiers are grouped from the viewpoint of an amplifier's performance (role) are displayed selectively by a user. For this reason, a tree representation optimized for the purpose of use can be displayed, and thus it is easy to find an amplifier to be monitored from the displayed tree diagram. Therefore, it is possible to facilitate the selection of an amplifier to be monitored, and thus it is possible to save labor and time in monitoring the amplifiers. By doing this, it is possible to know the amplifier's location in a simple way from the rack tree representation wherein amplifiers are grouped from the viewpoint of a rack on which the amplifiers are mounted. For example, it allows finding the location of an amplifier which has caused trouble in a simple way. Moreover, with the feed structure tree representation, it becomes easy to find and monitor an amplifier and a channel thereof to which a target speaker is connected.

Figure 15:
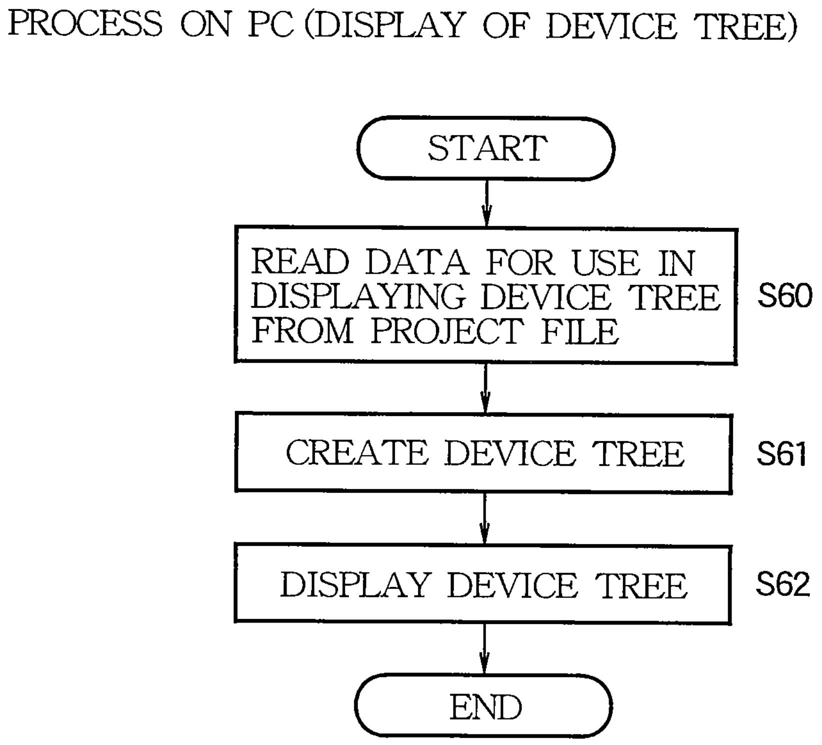
FIG. 15 is a flow chart of a device tree display process executed by the remote monitoring apparatus according to the present invention.

Referring now to FIG. 15, there is shown a flow chart of a device tree display process executed by the PC 1.

A device tree display process is activated when a "Device" tab 41 is selected in the monitoring screen 40 displayed in the display unit 13 of the PC 1. In step S60, data for displaying a device tree are read out from the project file. That is, information ranging from "device ID" to "area name" is extracted from the device information of "New amp1 (new type amplifier 6*a*)" and "New amp2 (new type amplifier 6*b*)" within the device information in the project file. Moreover, information ranging from "device ID" to "device information" is extracted from the device information of "ACD" within the device information. This device information corresponds to the device information of "Old amp1 (old type amplifier 7*a*)" and "Old amp2 (old type amplifier 7*b*)," and information ranging from "device ID" to "device name" is extracted from the device information of "Old amp1 (old type amplifier 7*a*)" and "Old amp2 (old type amplifier 7*b*)." In this manner, in the device tree display process, the group code is not extracted from the device information.

Subsequently, a device tree is created in step S61. In this step, by referring to the area ID from the information extracted in step S60, amplifiers are grouped into an amplifier group having the same area ID and thus belonging to the same area, and amplifiers belonging to each area are sorted whereby the device tree is created. Then, the created device tree is displayed in the display unit 13 in step S62, whereby the device tree display process is completed. When displaying the device tree, the extracted "area name" and "device name" are displayed.

Figure 16:
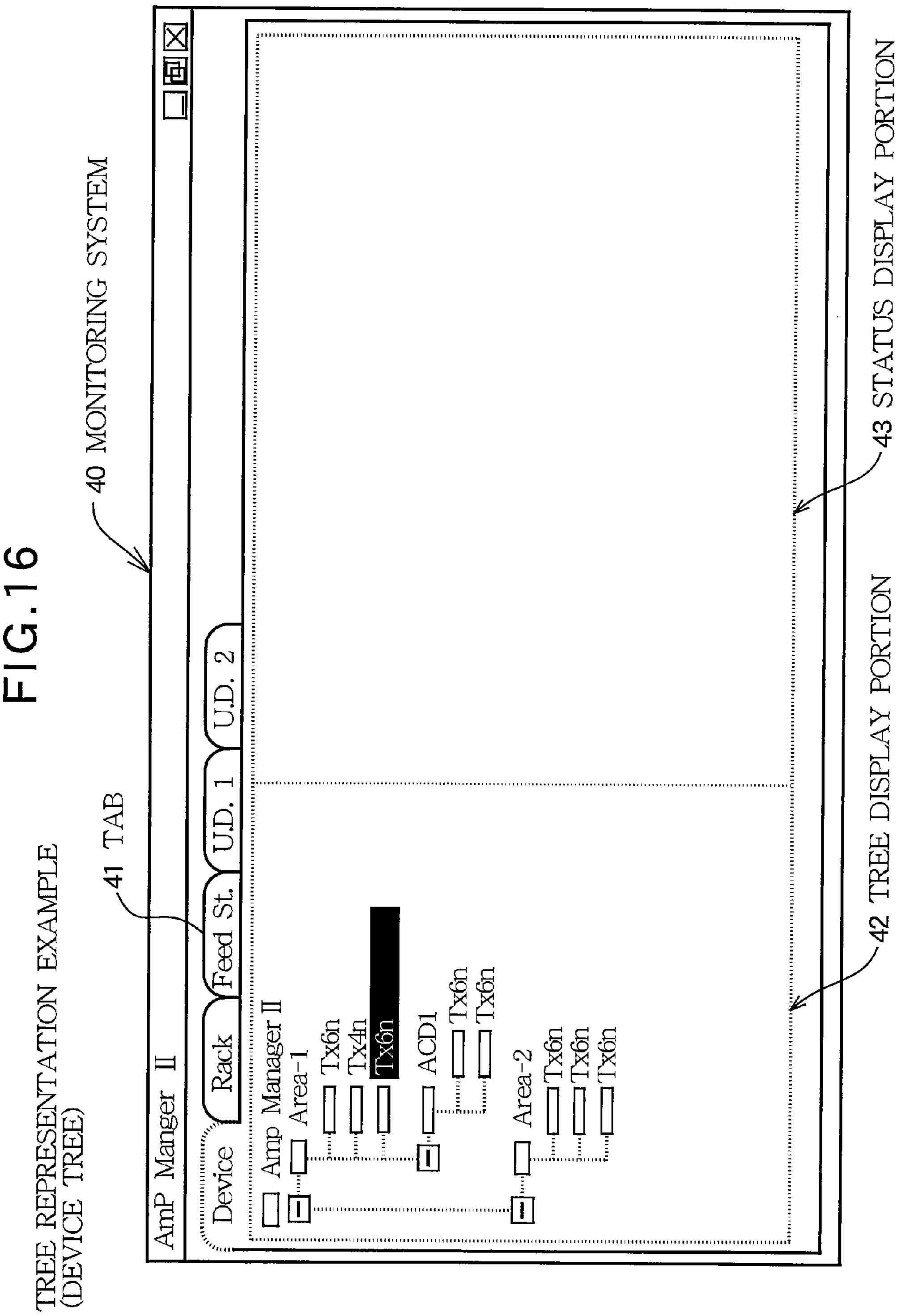
FIG. 16 is a diagram illustrating a representation example of a device tree displayed in the remote monitoring apparatus according to the present invention.

Referring now to FIG. 16, there is shown a representation example of a device tree displayed in the display unit 13 when the device tree display process is performed.

In the monitoring screen 40 shown in FIG. 16, the "Device" tab 41 is selected as the tree type and thus the above-described device tree display process is performed, and the device tree is displayed in the tree display portion 42. In the tree display portion 42, amplifiers belonging to an area having an area name "Area-1" are displayed in a tree representation, and amplifiers belonging to an area having an area name "Area-2" are displayed in a tree representation. In this tree representation, three amplifiers "Tx6n," "Tx4n," and "Tx6n" and "ACD1" are illustrated as belonging to the area "Area-1." Moreover, two amplifiers "Tx6n" and "Tx6n" are illustrated as belonging to "ACD1." Furthermore, three amplifiers "Tx6n," "Tx6n," and "Tx6n" are illustrated as belonging to the area "Area-2." In this manner, in the device tree representation, the ACD5 is displayed as well as the amplifiers which are displayed for each area. When one of the amplifiers in the device tree representation is selected (highlighted) as shown in FIG. 16, the state of the amplifier "Tx6n" belonging to the selected area "Area-1" is displayed in the status display portion 43. Examples of an item displayed in the status display portion 43 include a state of a power switch, input and output levels, and temperature of a heat sink of the selected amplifier. By monitoring these items, it is possible to know the operation state of the amplifier.

Figure 17:
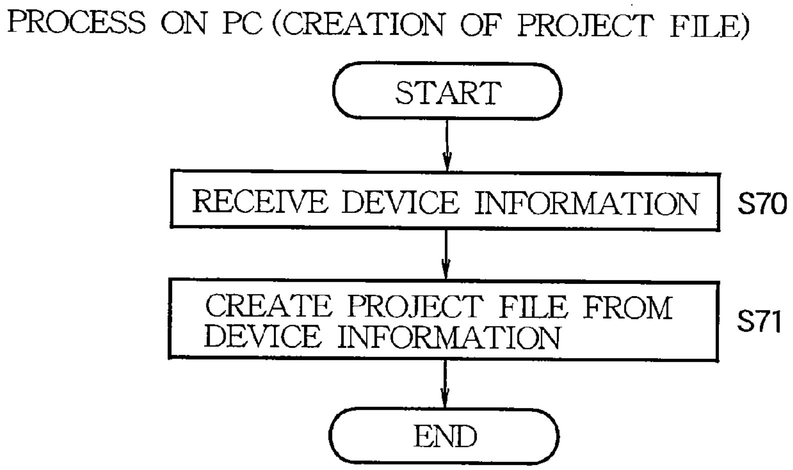
FIG. 17 is a flow chart of a project file creating process executed by the remote monitoring apparatus according to the present invention.
Figure 18:
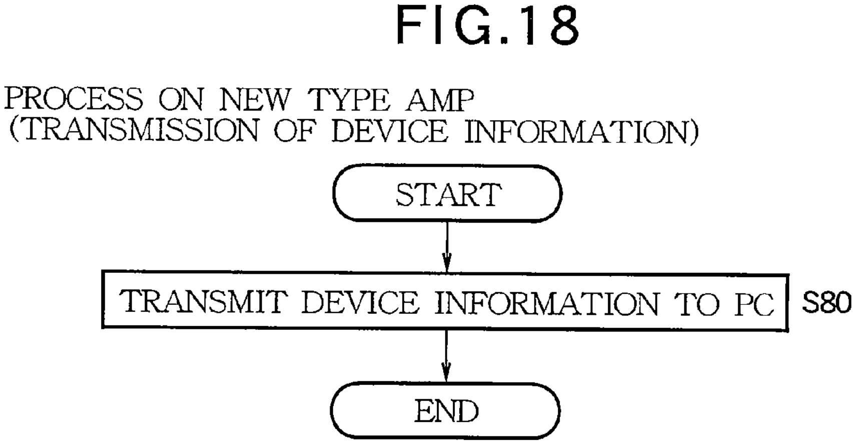
FIG. 18 is a flow chart of a device information transmission process executed by a new type amplifier in the audio system according to the present invention.
Figure 19:
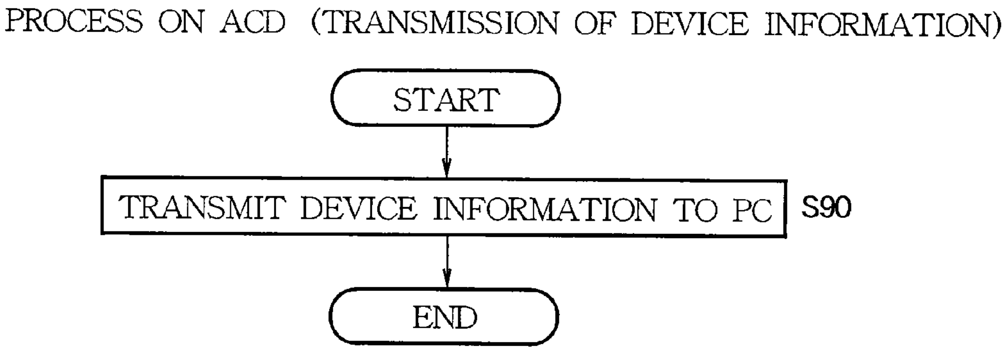
FIG. 19 is a flow chart of a device information transmission process executed by the ACD in the audio system according to the present invention.

Referring now to FIG. 17, there is shown a flow chart of a project file creating process executed by the PC 1. When creating the project file, the PC 1 issues a device information request to the devices connected to the network 4 and acquires the device information from the devices, thereby creating the project file. Referring to FIG. 18, there is shown a flow chart of a device information transmission process executed by the new type amplifier 6*a* and the new type amplifier 6*b* when the device information creating process is performed. Referring to FIG. 19, there is a flow chart of a device information transmission process executed by the ACD 5.

First, the device information transmission process shown in FIG. 18 will be described. This device information transmission process is activated by the new type amplifier 6*a* and the new type amplifier 6*b* having received the device information request issued from the PC 1 to the new type amplifier 6*a* and the new type amplifier 6*b*. Once activated, the whole device information shown in FIG. 6, recorded on the new type amplifiers per se is transmitted to the PC 1 in step S80, whereby the device information transmission process is completed.

The device information transmission process shown in FIG. 19 is activated by the ACD 5 when the device information request is issued from the PC 1 to the ACD 5. Once activated, the device information is acquired from the old type amplifier 7*a* and the old type amplifier 7*b* in step S90. Subsequently, the whole device information shown in FIG. 7 including the device information of the old type amplifiers 7*a* and the old type amplifiers 7*b* acquired in step S91 is transmitted to the PC 1, whereby the device information transmission process is completed.

The project file creating process shown in FIG. 17 is activated when the remote monitoring program is activated in the PC 1, and a device information transmission request is sent to the devices connected to the network 4 in step S70. In response to this step, the device information transmission process shown in FIG. 18 or 19 is performed, whereby the PC 1 receives and collects the device information of the devices connected to the network 4. Subsequently, the project file shown in FIG. 5 is created based on the collected device information, whereby the project file creating process is completed.

In the present invention described hereinabove, although a single ACD is provided, a plurality of ACDs may be provided. In such a case, the ACD may be configured to connect up to eight old type amplifiers to each other. Moreover, although a configuration wherein only the control information is delivered over the network is illustrated, a configuration wherein both the audio signal and the control information are delivered over the network may be possible. Furthermore, although the network is configured by the Ethernet, the network may be configured by a LAN.

The invention claimed is:

1. An apparatus for remotely monitoring a plurality of amplifiers on a display device, the amplifiers being provided to process audio signals and being directly or indirectly connected to a network, the apparatus comprising:

a selecting section for selecting one of a plurality of groupings of amplifiers, each amplifier allocated to at least a first grouping and a second grouping and having at least a first group code and a second group code respectively corresponding to the first and second groupings, the first and second group codes respectively corresponding to first and second tree types;

a collecting section that collects a group code corresponding to the selected grouping from each of the amplifiers through the network; and a display control section that displays a tree diagram of the amplifiers according to the collected group codes on the display device as a graphical representation of the selected grouping, wherein the displayed tree diagram is a first tree diagram displayed according to the first tree type when the selected grouping is the first grouping, wherein the displayed tree diagram is a second tree diagram displayed according to the second tree type when the selected grouping is the second grouping.

2. The apparatus according to claim 1, wherein the display control section selects one of the first grouping and the second grouping so as to display the tree diagram of the amplifiers corresponding to the selected one of the first grouping and the second grouping.

3. The apparatus according to claim 2, wherein the first grouping groups the plurality of the amplifiers based on locations of the respective amplifiers, and the second grouping groups the plurality of the amplifiers based on performances of the respective amplifiers, and wherein the display control section displays the tree diagram of the amplifiers sorted in terms of the locations thereof when the first grouping is selected, and displays the tree diagram of the amplifiers sorted in terms of the performances thereof when the second grouping is selected.

4. The apparatus according to claim 3, wherein each amplifier has one or more of channels for processing the audio signals separately from each other, and wherein the first group code is allocated singularly to the amplifier, while the second group code is allocated to each of the channels of the amplifier.

5. The apparatus according to claim 1, wherein one of the amplifiers is selected from the tree diagram of the amplifiers on the display device, wherein the collecting section acquires status information from the selected amplifier through the network, and wherein the display control section displays an operating state of the selected amplifier according to the acquired status information.

6. The apparatus according to claim 1, wherein each of the first grouping and the second grouping comprises two or more layers and the first group code and the second group code comprises two or more corresponding group numbers.

7. A method of remotely monitoring a plurality of amplifiers on a display device, the amplifiers being provided to process audio signals and being directly or indirectly connected to a network, the method comprising:

selecting one of a plurality of groupings of amplifiers, each amplifier allocated to at least a first grouping and a second grouping and having at least a first group code and a second group code respectively corresponding to the first and second groupings, the first and second group codes respectively corresponding to first and second tree types;

collecting a group code corresponding to the selected grouping from each of the amplifiers through the network; and displaying a tree diagram of the amplifiers according to the collected group codes on the display device as a graphical representation of the selected grouping, wherein the displayed tree diagram is a first tree diagram displayed according to the first tree type when the selected grouping is the first grouping, wherein the displayed tree diagram is a second tree diagram displayed according to the second tree type when the selected grouping is the second grouping.

8. The method according to claim 7, further comprising selecting one of the first grouping and the second grouping so as to display the tree diagram of the amplifiers corresponding to the selected one of the first grouping and the second grouping.

9. The method according to claim 7, wherein each of the first grouping and the second grouping comprises two or more layers and the first group code and the second group code comprises two or more corresponding group numbers.

* * * * *